(12) United States Patent
Green

(10) Patent No.: US 10,876,677 B2
(45) Date of Patent: Dec. 29, 2020

(54) ADJUSTABLE STAND FOR COMPUTING DEVICE

(71) Applicant: Andrew Bradford Green, Mt. Pleasant, SC (US)

(72) Inventor: Andrew Bradford Green, Mt. Pleasant, SC (US)

( * ) Notice: Subject to any disclaimer, the term of this patent is extended or adjusted under 35 U.S.C. 154(b) by 0 days.

(21) Appl. No.: 14/083,728

(22) Filed: Nov. 19, 2013

(65) Prior Publication Data
US 2014/0139082 A1 May 22, 2014

Related U.S. Application Data

(60) Provisional application No. 61/727,991, filed on Nov. 19, 2012.

(51) Int. Cl.
*F16M 11/04* (2006.01)
*F16M 13/00* (2006.01)
*F16M 11/26* (2006.01)
*A47B 23/04* (2006.01)
*F16M 11/28* (2006.01)

(52) U.S. Cl.
CPC ......... *F16M 11/046* (2013.01); *A47B 23/042* (2013.01); *F16M 11/048* (2013.01); *F16M 13/00* (2013.01); *F16M 11/28* (2013.01); *F16M 2200/066* (2013.01); *F16M 2200/08* (2013.01)

(58) Field of Classification Search
CPC ...... F16M 11/28; F16M 11/046; F16M 13/00; F16M 2200/08; F16M 2200/066; A47B 23/042; A47B 2023/049

USPC ......... 248/125.1, 125.3, 125.7, 125.8, 125.9, 248/165, 176.1, 917, 161, 188.4, 188.5; D14/453, 447; D6/656.11, 656.15
See application file for complete search history.

(56) References Cited

U.S. PATENT DOCUMENTS

| 4,886,230 | A | * | 12/1989 | Jones | F16M 11/10 248/170 |
|---|---|---|---|---|---|
| D314,505 | S | * | 2/1991 | Chen | D8/380 |
| D350,127 | S | * | 8/1994 | Gummeson et al. | D14/453 |
| 5,465,671 | A | * | 11/1995 | Genest | A47B 23/00 108/147 |
| 5,769,369 | A | * | 6/1998 | Meinel | B60N 3/001 248/176.1 |
| 6,315,252 | B1 | * | 11/2001 | Schultz | B60R 11/0252 108/44 |
| 6,405,653 | B1 | * | 6/2002 | Miskelly | F42B 10/38 102/374 |
| 6,412,742 | B1 | * | 7/2002 | Yu | 248/166 |
| D529,911 | S | * | 10/2006 | Yamashiro | D14/375 |
| 7,980,737 | B2 | * | 7/2011 | Hu | F16M 13/00 248/176.3 |
| 8,020,818 | B2 | * | 9/2011 | Chou et al. | 248/176.1 |
| D652,045 | S | * | 1/2012 | Hong | D14/447 |

(Continued)

*Primary Examiner* — Tan Le
(74) *Attorney, Agent, or Firm* — Wayne Edward Ramage Baker Donelson

(57) ABSTRACT

A stand for use with a laptop or portable computing device, such as, but not limited to, a MacBook. The stand elevates a laptop or portable computing device up off a desk or table top, reducing neck strain in the user and creating a more comfortable work setting. An adjustable-height stem connects a base and platform. The base also may be used alone, and comprises means for support the bottom of a computer stand. The base also may comprise storage space or shelves.

7 Claims, 17 Drawing Sheets

(56) References Cited

U.S. PATENT DOCUMENTS

| | | | |
|---|---|---|---|
| 8,186,639 B2 * | 5/2012 | Wang | 248/371 |
| D690,306 S * | 9/2013 | Malisse | D14/447 |
| 8,960,104 B2 * | 2/2015 | Copeland | A47B 3/00 |
| | | | 108/117 |
| 2006/0016945 A1 * | 1/2006 | Taylor | F16M 11/28 |
| | | | 248/188.5 |
| 2007/0259554 A1 * | 11/2007 | Lindblad | F16M 11/04 |
| | | | 439/354 |
| 2010/0243850 A1 * | 9/2010 | Derry | F16M 11/10 |
| | | | 248/372.1 |
| 2012/0325987 A1 * | 12/2012 | Zhao et al. | 248/165 |
| 2013/0306807 A1 * | 11/2013 | Liang | F16M 13/00 |
| | | | 248/124.1 |
| 2017/0293208 A1 * | 10/2017 | Hale | G03B 17/566 |

\* cited by examiner

ADJUSTABLE STAND FOR COMPUTING DEVICE

This application claims benefit of and priority to U.S. Provisional Application No. 61/727,991, filed Nov. 19, 2012, by Andrew Green, and is entitled to that filing date for priority. The specification, figures and complete disclosure of U.S. Provisional Application No. 61/727,991 are incorporated herein by specific reference for all purposes.

FIELD OF INVENTION

This invention relates to a height-adjustable stand for use with a computing device, including but not limited to a laptop computer.

BACKGROUND OF THE INVENTION

While laptops have significant advantages over desktop computers in size and portability, they can be difficult to use. Many people place a laptop computer on their legs or lap while sitting or reclining, which can result in the computer overheating due to lack of air circulation. The same problem may arise when the laptop is placed on a desktop, counter or table top. In addition, when placed in such a position, the display of the laptop usually is below the most comfortable ergonomic viewing height for the user.

Accordingly, what is needed is a device for raising a laptop or display monitor on a desktop or table top to varying heights in a stable manner according to the desires of a user.

SUMMARY OF INVENTION

In various embodiments, the present invention comprises a stand for use with a laptop or portable computing device, such as, but not limited to, a MacBook. The stand elevates the laptop or portable computing deviceup off a desk or table top, reducing neck strain in the user and creating a more comfortable work setting. When used with a keyboard and/or mouse, it creates a convenient workstation.

In one embodiment, the invention comprises a base, a platform for holding the laptop or portable computing device, and an adjustable-height stem connecting the base and platform. The stem comprises a female component that receives a male component, wherein the male component can be moved up and down and locked into place at the desired height by a bolt, screw, or other means. A spring may be placed inside the stem to assist in raising or lowering the height to the desired viewing position.

The platform may be of any configuration suitable for the type of laptop or portable computing device, and may contain slots or holes to promote ventilation. In the embodiment shown, the platform comprises a pair of angled arms that extend forward in a V-shape and down at an angle. The arms may or may not contain slots or holes, as ventilation may be provided by the space around the arms. The arms provide an advantage over the larger square platforms known in the prior art by providing maximum airflow around the laptop. The length of the arms may vary. In one embodiment, the arms may not be visible when in use with a suitable laptop, which enhances the aesthetics of the device in use.

The top of the platform or arms may be covered in whole or in part with a nonslip material, such as rubber, silicone, or the like. The nonslip material grips the laptop and holds it in place.

The stem may be placed in any location on the base and platform, depending on the material used and the relative centers of gravity. In the exemplary embodiment shown, the stem is located near the back of the base and the platform (i.e., with the platform arms extending forward and downward from the stem). This allows a laptop to be balanced on top of the stand securely in an open position, with the monitor located above or just behind the stem.

The height of the platform can be adjusted by loosening the screw or bolt, moving the platform up or down relative to the base, and tightening the screw or bolt at the desired height. This allows the user to position the laptop at a comfortable viewing position. Further, in configurations where the laptop or portable computing device is connected to an external monitor (or used with a personal computer or other computing device), the height of the laptop can be adjusted to match the height of the other monitor, effectively creating a dual-monitor workstation.

In another embodiment, the platform is rotatable. The stem may be rotatable with respect to the base, so that the platform may be moved from side to side. A separate bolt or screw may be used to lock the stem in place. Or the platform may be rotatable with respect to the stem. In yet another alternative embodiment, the top of the base may be rotatable with respect to the bottom of the base. In yet another embodiment, Teflon rails (or similar material) may be placed on the bottom of the base to allow the stand to be rotated or moved without leaving marks on the surface of the desk or table. Alternatively, the bottom of the base may comprise a rubber, plastic, silicone or similar covering in whole or in part, or feet made of the same material or materials.

In yet another embodiment, a base comprises a box shape with a plurality of slots on the interior of the right and left sides. The flat bottom of a stand can be slid into matching slots at the desired height. In another embodiment, an internal metal support shelf can be slid into position at the desired height, and the bottom of a stand can be placed on the shelf. The stand can be a laptop or portable computing device support stand, or a computer monitor support stand. This allows the monitor or computing device to be positioned at a comfortable viewing height.

The number of slots (and thus, height positions) in the base can vary. In one embodiment, there are four to eight internal positions. In the embodiment shown, there are six internal positions (i.e., six slots on each side). In one particular embodiment, one of the internal positions is designed to position an iMac or Apple computer display monitor at the same height as an Apple Thunderbolt display monitor.

In another embodiment, the base also provides storage. The interior of the box below the shelf or bottom of the stand can be used to store a variety of items, including, but not limited to, a backup hard drive, wallet, keys, iPod, USB drive, or the like. A removable front faceplate may be used on the front of the box, and a removable back faceplate also may be used. The faceplates may cover the respective opening in whole or in part. The faceplate or faceplates may be solid, or slotted or perforated to provide ventilation (i.e., to keep a hard drive in the base cool). The faceplates may be attached by magnets, hooks, slots, or similar means for ease of removal, or may be more securely affixed with screws or the like. The bottom of the base may comprise Teflon sliders or rails to allow movement of the base, as described above. A covering or feet may also be provided, as described above.

BRIEF DESCRIPTION OF THE DRAWINGS

FIG. 7 shows a view of the stand of FIG. 1 in use as a workstation.

DETAILED DESCRIPTION OF EXEMPLARY EMBODIMENTS

Figure 1:
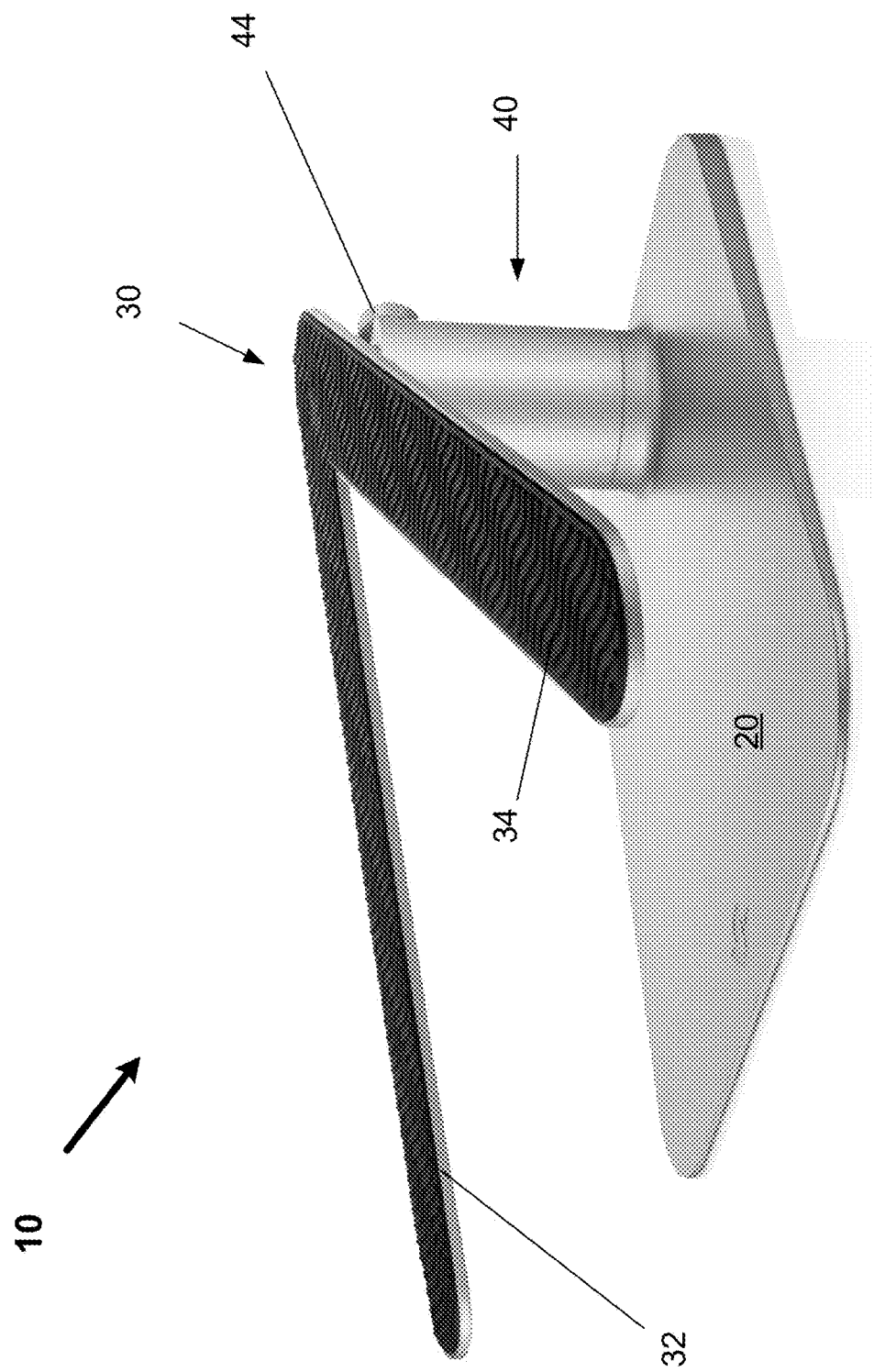
FIG. 1 shows a view of stand in accordance with an embodiment of the present invention.
Figure 2:
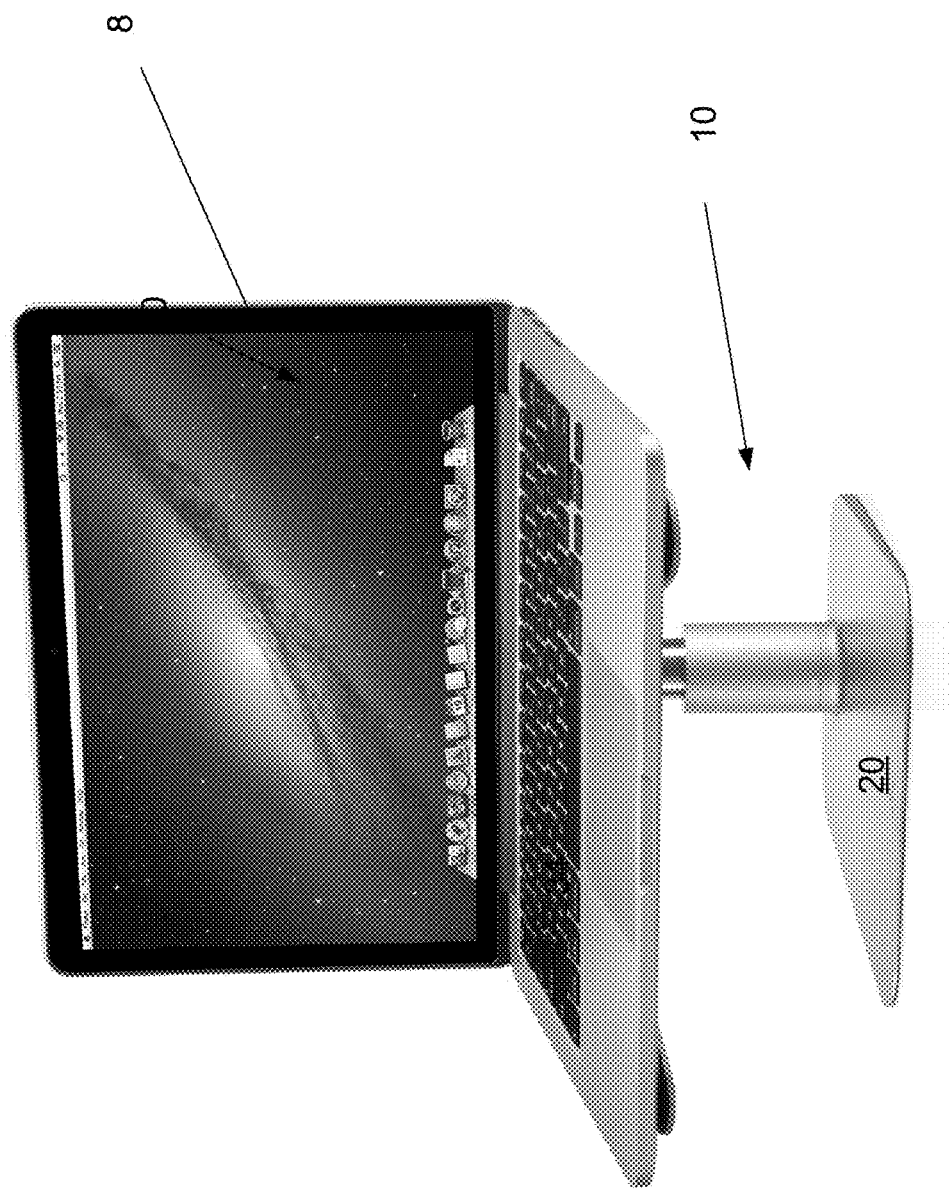
FIGS. 2-7 show views of the stand of FIG. 1 in use with a laptop computer.
Figure 3:
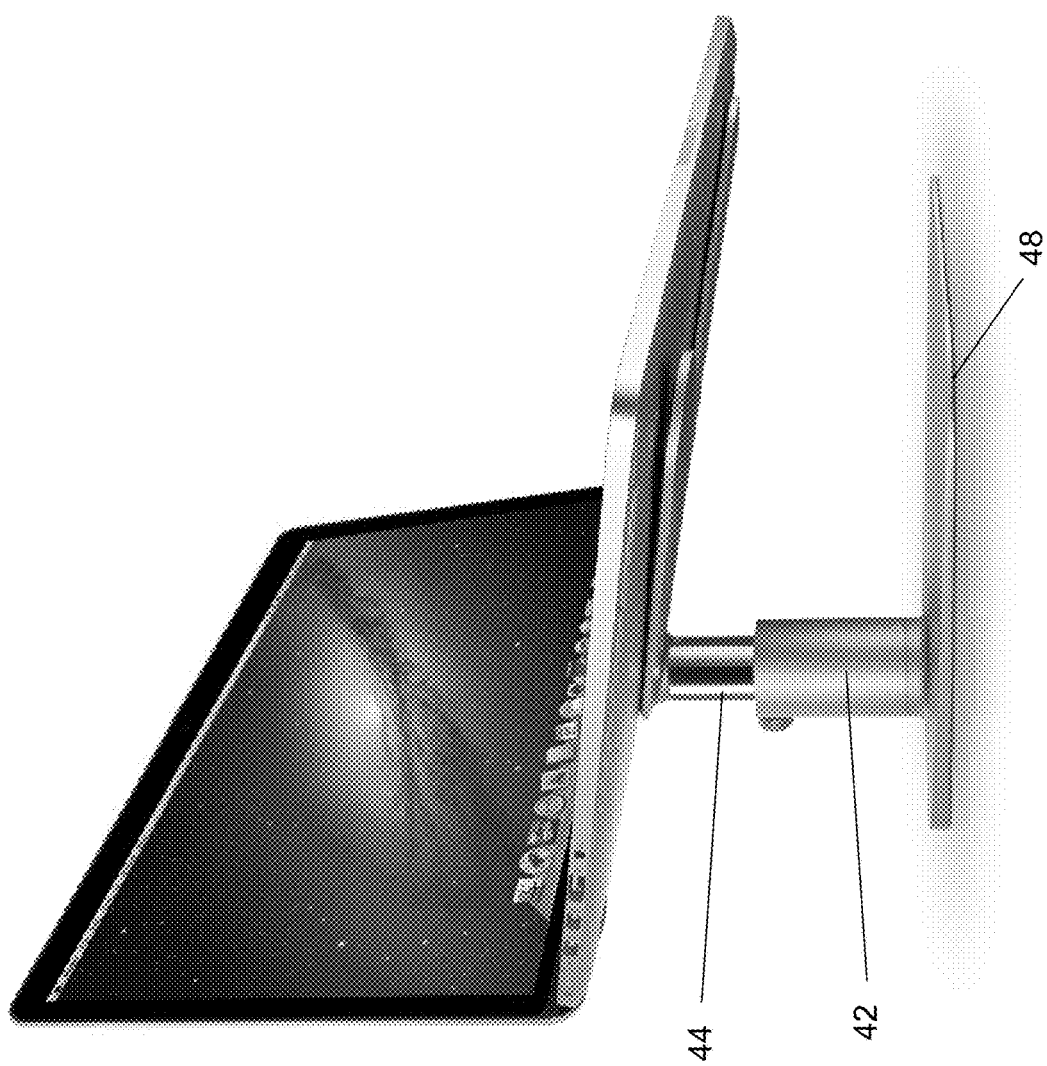
Figure 4:
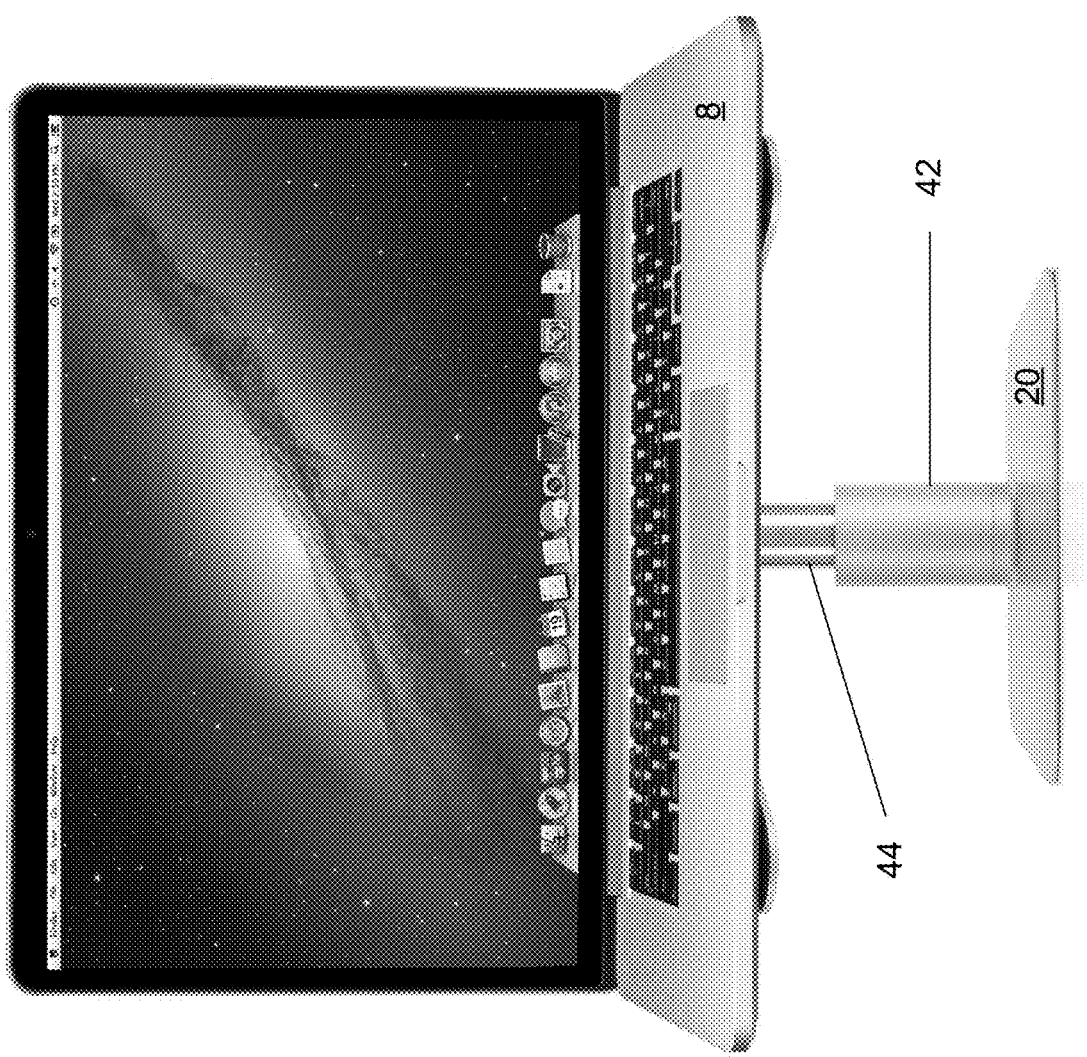
Figure 5:
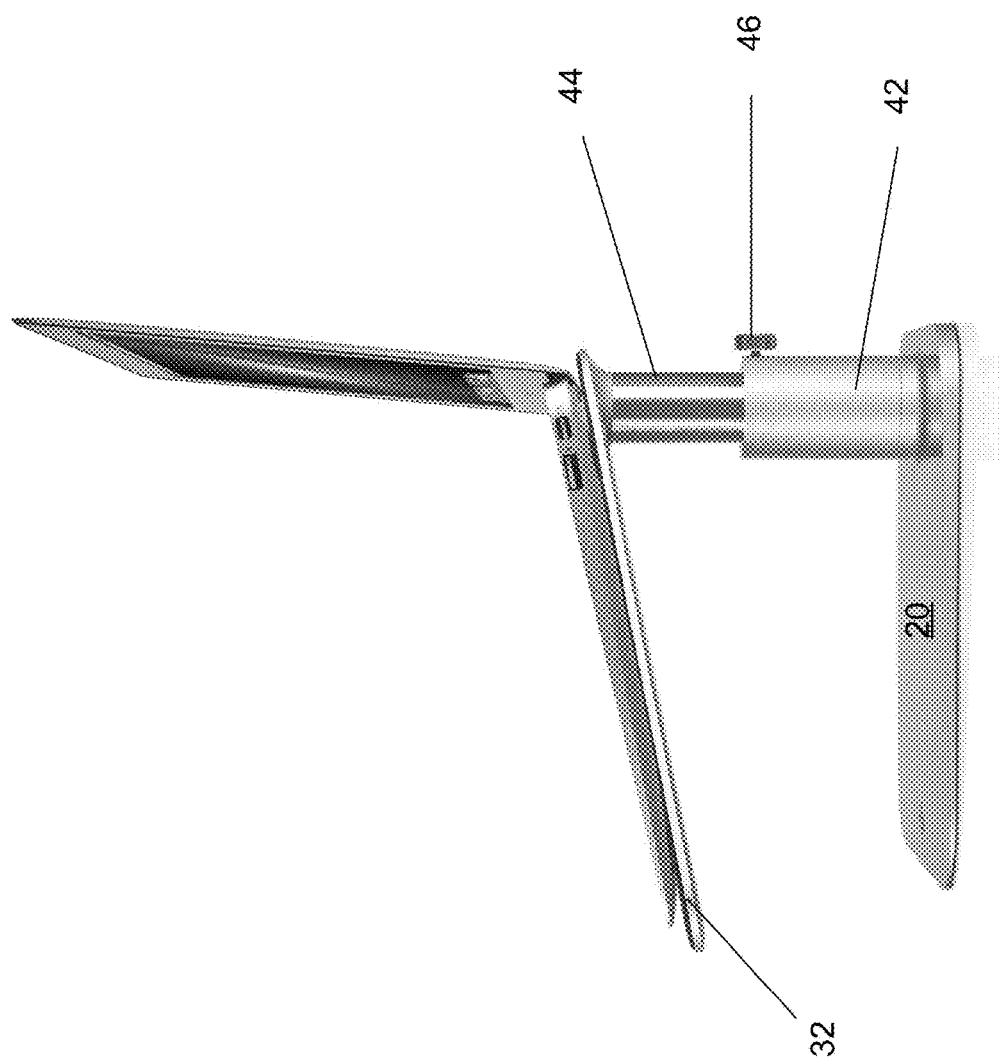
Figure 6:
Figure 7:
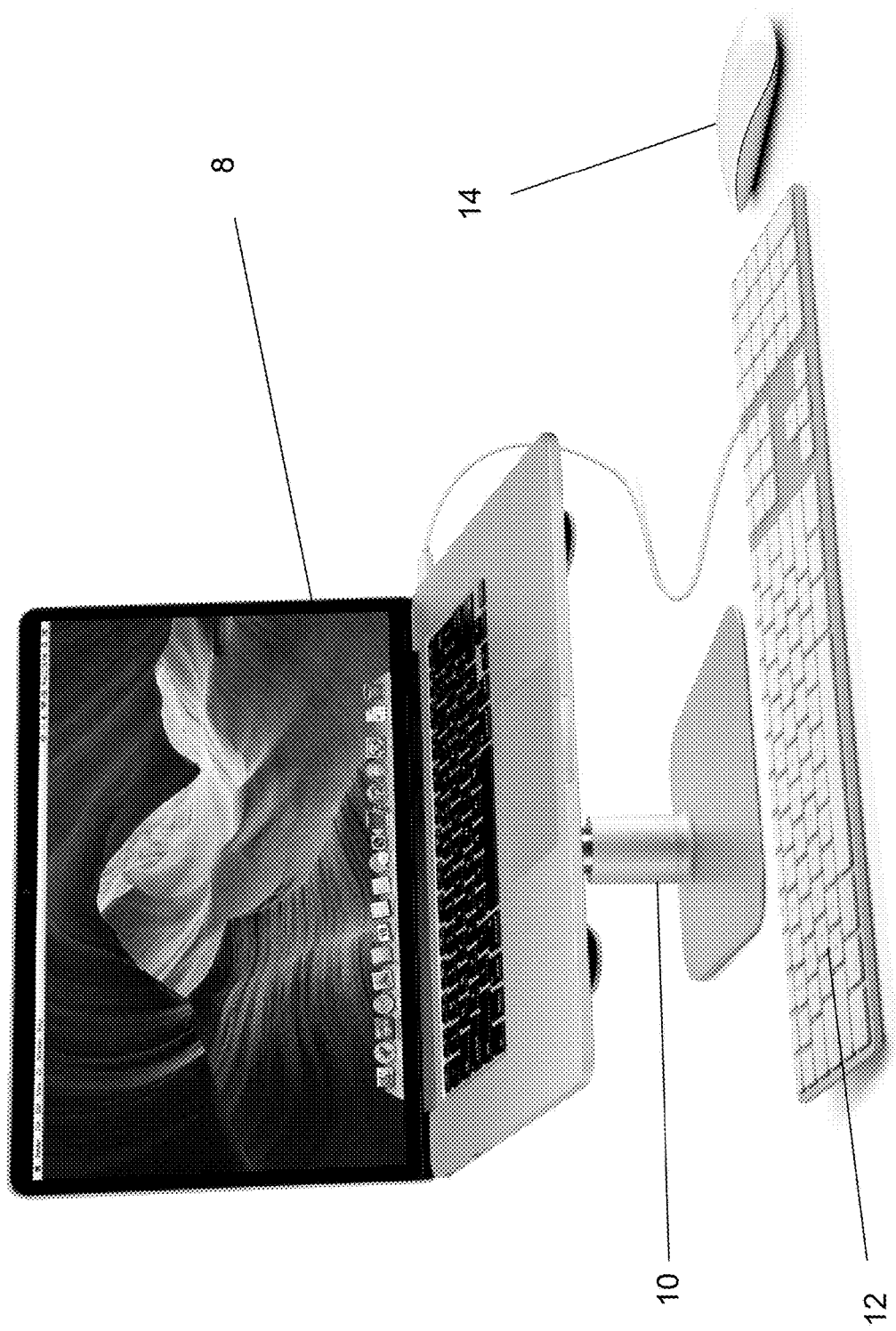
Figure 8:
FIG. 8 shows a view of the stand of FIG. 1 in use with a laptop and second display monitor.

In one exemplary embodiment, as seen in FIGS. 1-8, the present invention comprises a stand 10 for use with a laptop or portable computing device, such as, but not limited to, a MacBook. The stand elevates the laptop or portable computing device 8 up off a desk or table top, reducing neck strain in the user and creating a more comfortable work setting. When used with a keyboard 12 and/or mouse 14, as seen in FIGS. 7 and 8, it creates a convenient workstation.

In the embodiment shown, the invention comprises a base 20, a platform 30 for holding the laptop or portable computing device, and an adjustable-height stem 40 connecting the base and platform. In one embodiment, the stem comprises a female component 42 that receives a male component 44, wherein the male component can be moved up and down and locked into place at the desired height by a bolt, screw 46, or other means. A spring may be placed inside the stem to assist in raising or lowering the height to the desired viewing position.

The platform may be of any configuration suitable for the type of laptop or portable computing device, and may contain slots or holes to promote ventilation. In the embodiment shown, the platform comprises a pair of angled arms 32 that extend forward in a V-shape and down at an angle. The arms may or may not contain slots or holes, as ventilation may be provided by the space around the arms. The arms provide an advantage over the larger square platforms known in the prior art by providing maximum airflow around the laptop. The length of the arms may vary. In one embodiment, the arms may not be visible when in use with a suitable laptop, which enhances the aesthetics of the device in use.

The top of the platform or arms may be covered in whole or in part with a nonslip material 34, such as rubber, silicone, or the like. The nonslip material grips the laptop and holds it in place.

The stem may be placed in any location on the base and platform, depending on the material used and the relative centers of gravity. In the exemplary embodiment shown, the stem is located near the back of the base and the platform (i.e., with the platform arms extending forward and downward from the stem). This allows a laptop 8 to be balanced on top of the stand securely in an open position, with the monitor located above or just behind the stem.

The height of the platform can be adjusted by loosening the screw or bolt 44, moving the platform up or down relative to the base, and tightening the screw or bolt at the desired height. This allows the user to position the laptop at a comfortable viewing position. Further, in configurations where the laptop or portable computing device is connected to an external monitor 16 (or used with a personal computer or other computing device), the height of the laptop can be adjusted to match the height of the other monitor, effectively creating a dual-monitor workstation.

In another embodiment, the platform is rotatable. The stem 40 may be rotatable with respect to the base 20, so that the platform 30 may be moved from side to side. A separate bolt or screw may be used to lock the stem in place. Or the platform may be rotatable with respect to the stem. In yet another alternative embodiment, the top of the base may be rotatable with respect to the bottom of the base. In yet another embodiment, Teflon rails (or similar material) may be placed on the bottom of the base to allow the stand to be rotated or moved without leaving marks on the surface of the desk or table. Alternatively, the bottom of the base may comprise a rubber, plastic, silicone or similar covering 48 in whole or in part, or feet made of the same material or materials.

In one embodiment, the stand is made of brushed metal, or similar material, with a total weight of 1.5 to 2.5 pounds. The base is 7 to 8 inches wide, and 7 to 9 inches deep. The arm span is 9 to 12 inches. The stem may extend for a range from about 2 inches to up to 6 to 8 inches above the base.

Figure 9:
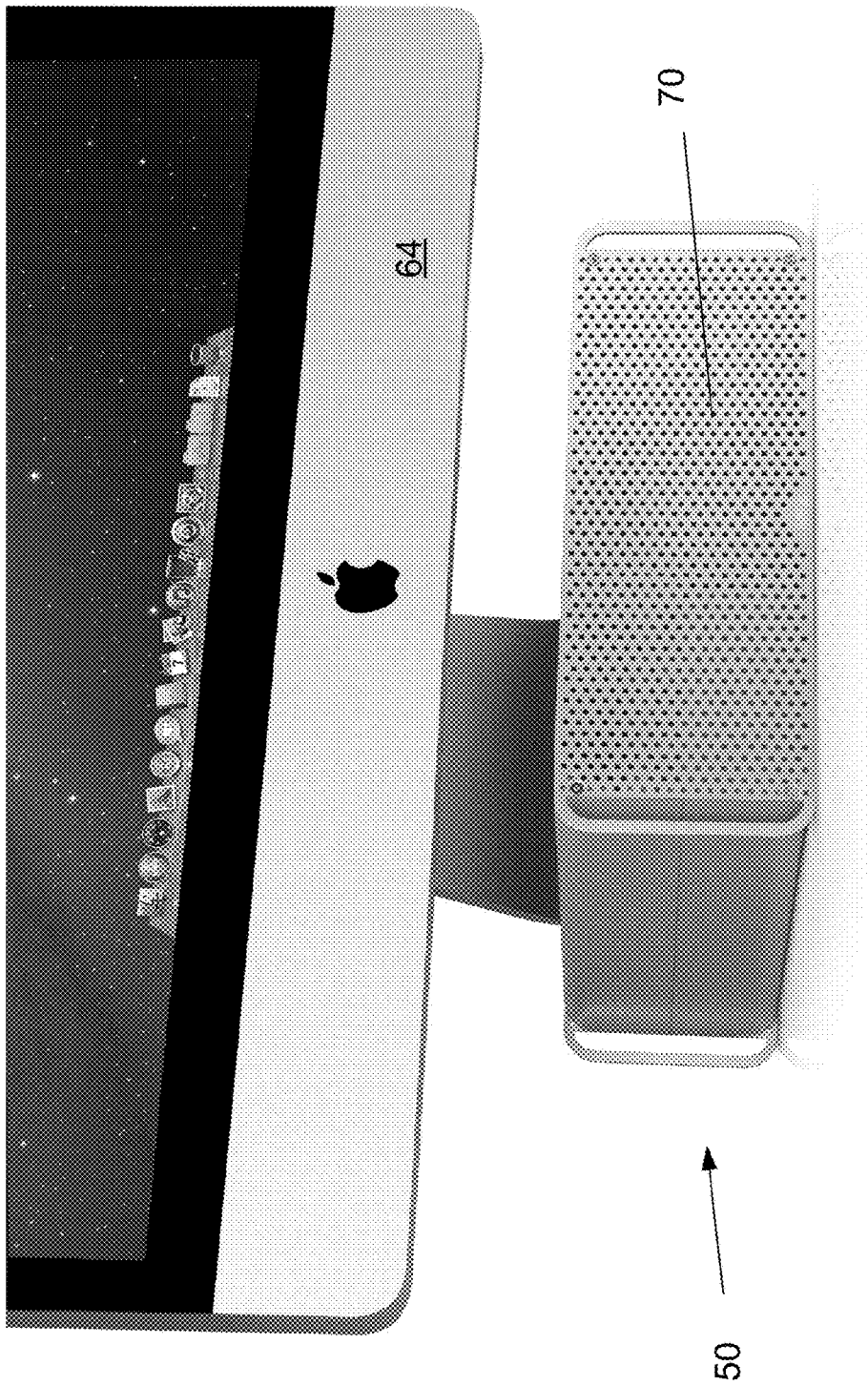
FIGS. 9-14 show views of a base for a stand in accordance with another exemplary embodiment of the present invention.
Figure 10:
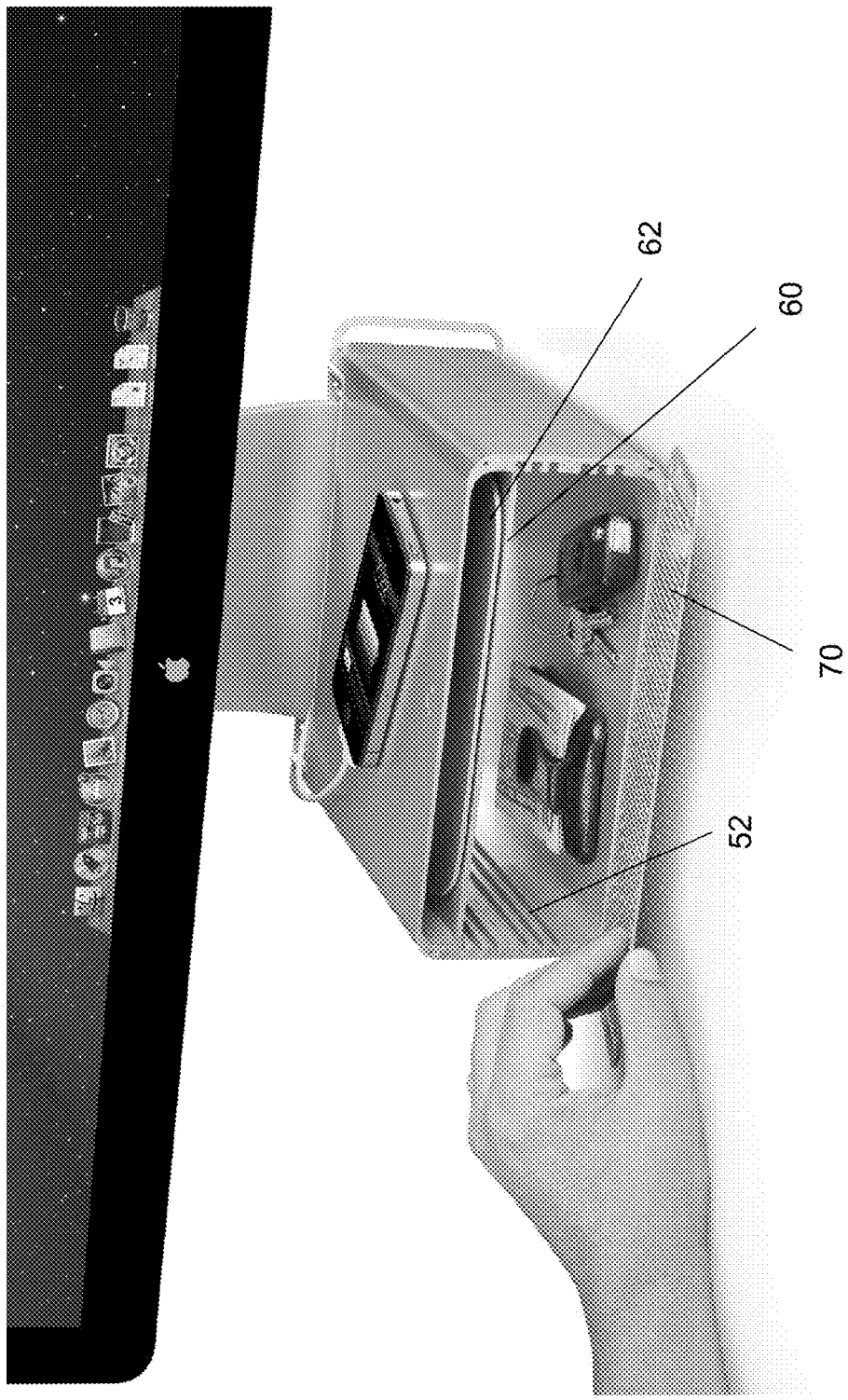
Figure 11:
Figure 12:
Figure 13:
Figure 14:
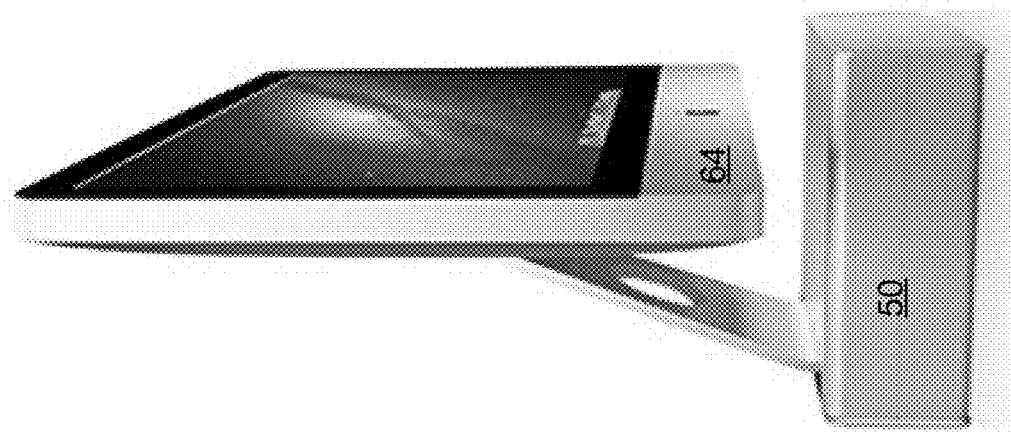

In yet another embodiment, as seen in FIGS. 9-16, a base 50 comprises a box shape with a plurality of slots 52 on the interior of the right and left sides. In one embodiment, the flat bottom 62 of a stand can be slid into matching slots at the desired height. In another embodiment, an internal metal support shelf 60 can be slid into position at the desired height, and the bottom of a stand 62 can be placed on the shelf. The stand can be a laptop or portable computing device support stand, or a computer monitor support stand, as seen in FIG. 9. This allows the monitor 64 or computing device to be positioned at a comfortable viewing height.

Figure 15:
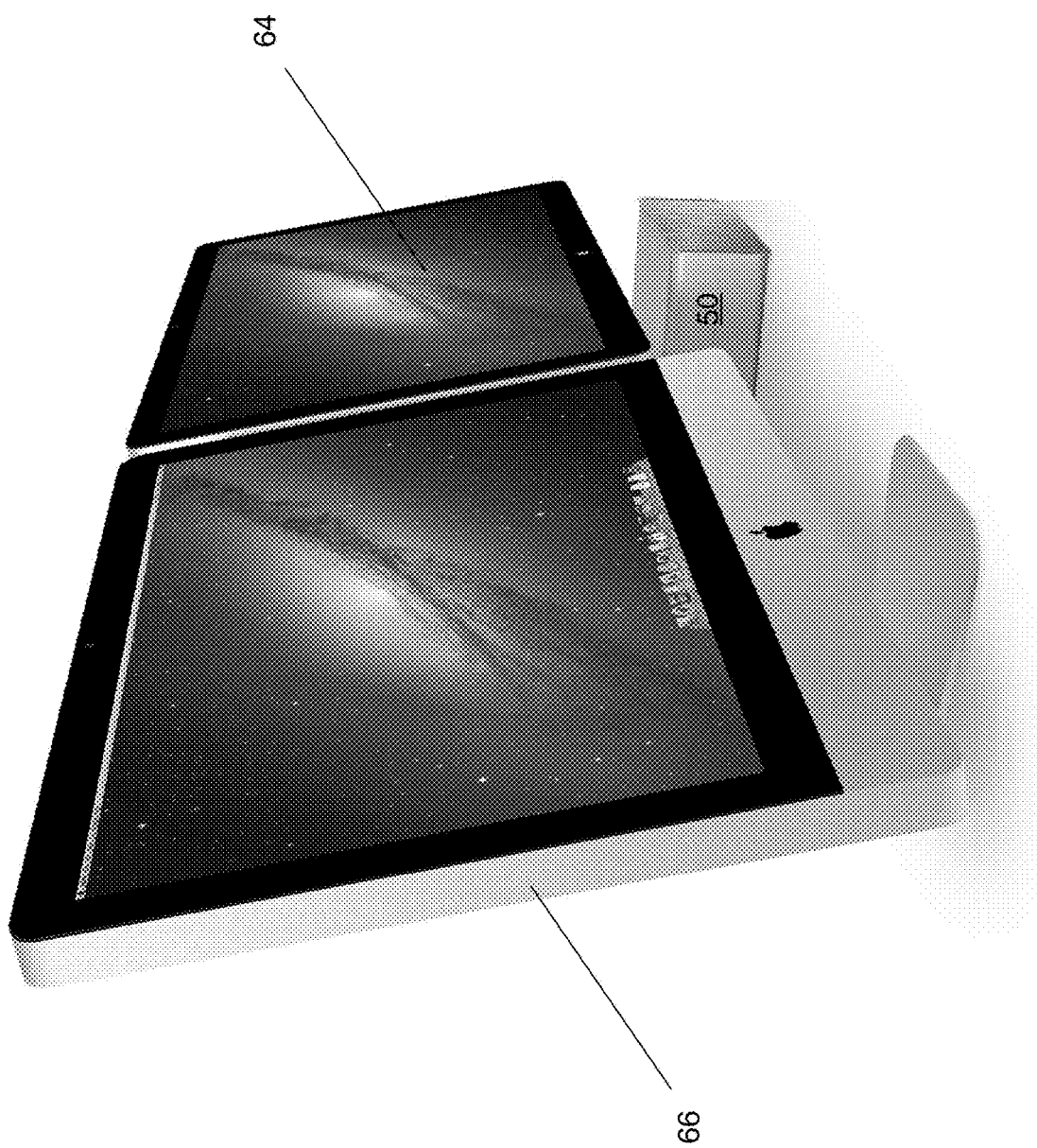
FIGS. 15-16 show views of the base of FIG. 9 in use with a display monitor and a separate Thunderbolt display monitor.
Figure 16:
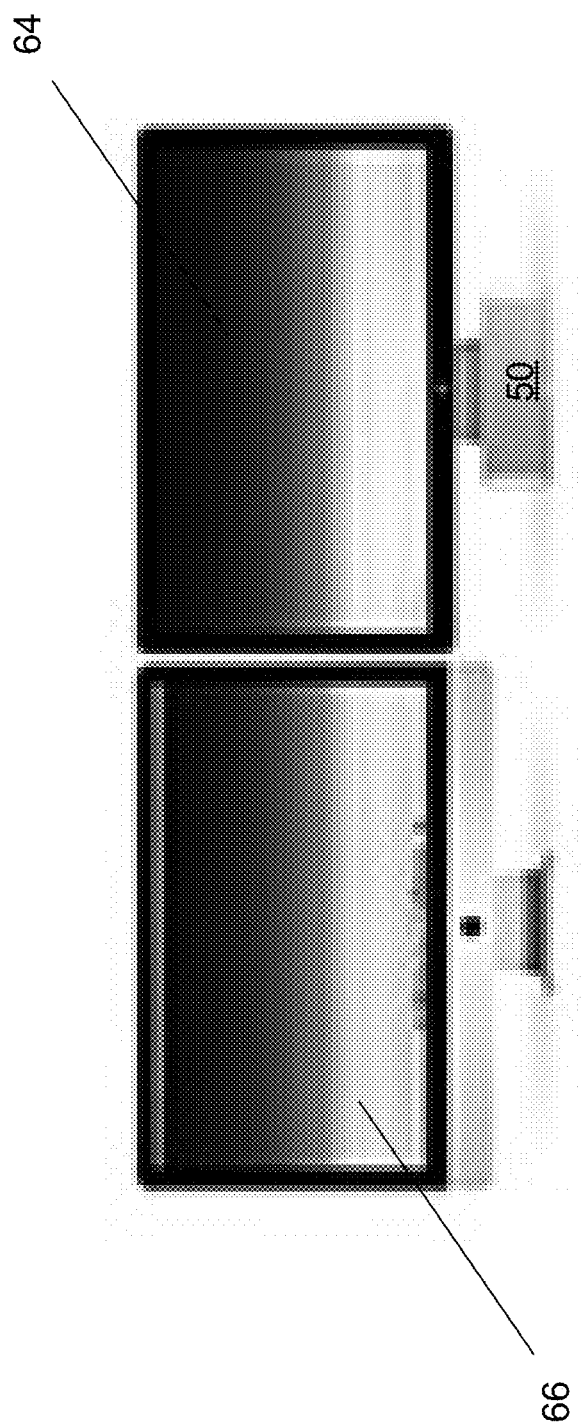
Figure 17:
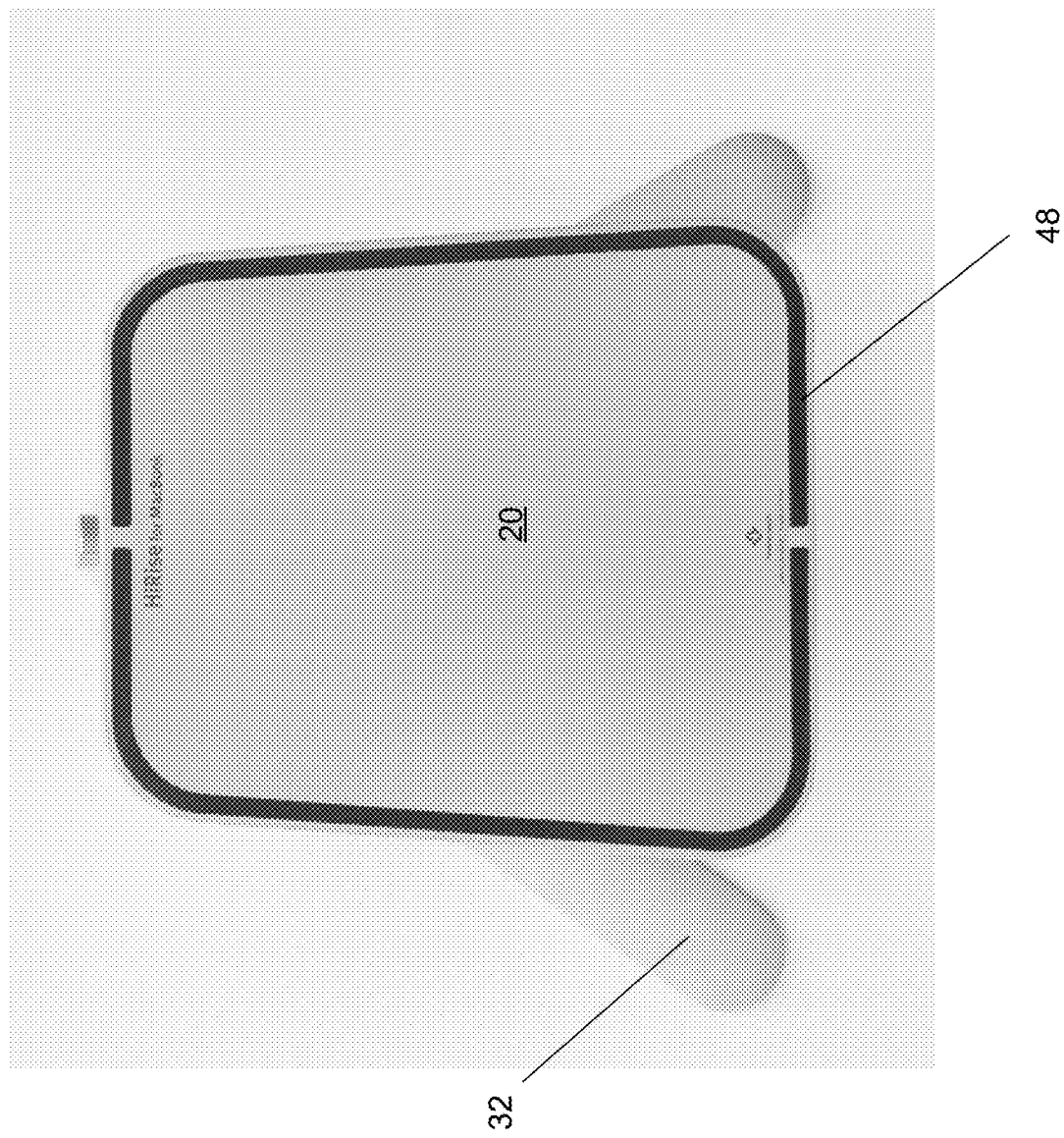
FIG. 17 shows a view of the bottom of the stand of FIG. 1.

The number of slots 52 (and thus, height positions) in the base can vary. In one embodiment, there are four to eight internal positions. In the embodiment shown, there are six internal positions (i.e., six slots on each side). In one particular embodiment, one of the internal positions is designed to position an iMac or Apple computer display monitor 64 at the same height as an Apple Thunderbolt display monitor 66, as seen in FIGS. 15 and 16.

In another embodiment, the base also provides storage. The interior of the box below the shelf or bottom of the stand can be used to store a variety of items, including, but not limited to, a backup hard drive, wallet, keys, iPod, USB drive, or the like. A removable front faceplate 70 may be used on the front of the box, and a removable back faceplate 72 also may be used. The faceplates may cover the respective opening in whole or in part. The faceplate or faceplates may be solid, or slotted or perforated to provide ventilation (i.e., to keep a hard drive in the base cool). The faceplates may be attached by magnets, hooks, slots, or similar means for ease of removal, or may be more securely affixed with screws or the like.

The bottom of the base may comprise Teflon sliders or rails to allow movement of the base, as described above. A covering or feet may also be provided, as described above.

In one exemplary embodiment, the base is 3 to 4 inches high, 7 to 9 inches wide, and 7 to 10 inches wide, and weighs from 3 to 5 pounds. There are six slots on the interior of each side, with the slots placed at heights of approximately 0.9 inches, 1.18 inches, 1.42 inches, 1.96 inches, 2.24 inches, and 2.51 inches.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A stand for a computing device, comprising:
a single unitary base with a flat bottom;
a covering on the bottom of the base, in whole or in part;
an adjustable-length stem extending vertically upward orthogonally from the base, the stem comprising an upper stem with a top and a lower stem;
a first elongated arm with a flat top, an upper end, and a lower end, said first elongated arm extending outward and downward at a fixed first angle from the top of the upper stem; and
a second elongated arm with a flat top, an upper end, and a lower end, said second elongated arm extending outward and downward at a fixed second angle from the top of the upper stem;
wherein the second angle is the same as the first angle, and the first angle is an acute angle with respect to the upper stem;
further wherein the first elongated arm and the second elongated arm form a third angle with respect to each other, where the third angle is fixed and acute;
further wherein the first elongated arm and the second elongated arm are closest together proximate to the upper stem, diverge therefrom downward and outward, and are furthest apart at their respective lower ends;
further wherein the first elongated arm and the second elongated arm are configured to support a laptop computing device at the fixed first angle; and
further where the first elongated arm, the second elongated, and the upper stem are fixed in position with respect to each other.

2. The stand of claim 1, further comprising a nonslip material affixed to at least part of the top of the first elongated arm or second elongated arm, or both.

3. The stand of claim 1, wherein the stem can be adjusted to a plurality of heights.

4. The stand of claim 1, wherein the stem comprises a telescoping column.

5. The stand of claim 1, wherein the first elongated arm and the second elongated arm together are rotatable with respect to the stem.

6. The stand of claim 1, wherein the stem is rotatable with respect to the base.

7. The stand of claim 1, each arm comprising an distal end in relation to the stem, further wherein said distal ends do not extend beyond the computing device when supporting said computing device.

* * * * *